(12) United States Patent
Dong et al.

(10) Patent No.: US 11,656,942 B2
(45) Date of Patent: May 23, 2023

(54) METHODS FOR DATA WRITING AND FOR DATA RECOVERY, ELECTRONIC DEVICES, AND PROGRAM PRODUCTS

(71) Applicant: EMC IP Holding Company LLC, Hopkinton, MA (US)

(72) Inventors: Jibing Dong, Beijing (CN); Jian Gao, Beijing (CN); Shaoqin Gong, Beijing (CN); Jianbin Kang, Beijing (CN); Chun Ma, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 385 days.

(21) Appl. No.: 16/885,947

(22) Filed: May 28, 2020

(65) Prior Publication Data

US 2021/0133029 A1 May 6, 2021

(30) Foreign Application Priority Data

Oct. 31, 2019 (CN) .......................... 201911054443.8

(51) Int. Cl.
*G06F 11/10* (2006.01)
*G06F 11/14* (2006.01)
*G06F 9/30* (2018.01)
*G06F 3/06* (2006.01)

(52) U.S. Cl.
CPC .......... *G06F 11/1088* (2013.01); *G06F 3/064* (2013.01); *G06F 3/0619* (2013.01); *G06F 3/0689* (2013.01); *G06F 9/30029* (2013.01); *G06F 11/1004* (2013.01); *G06F 11/1489* (2013.01)

(58) Field of Classification Search
CPC .... G06F 11/1088; G06F 3/0619; G06F 3/064; G06F 3/0689; G06F 9/30029; G06F 11/1004; G06F 11/1489
USPC ....................................................... 714/6.22
See application file for complete search history.

(56) References Cited

U.S. PATENT DOCUMENTS

| 8,849,878 | B1 | 9/2014 | Bachu et al. | |
| 10,452,290 | B2 | 10/2019 | Kirkpatrick et al. | |
| 11,093,333 | B1 | 8/2021 | Zlotnick et al. | |
| 2020/0117358 | A1* | 4/2020 | Krishnamurthy | G06F 3/0611 |
| 2021/0279135 | A1* | 9/2021 | Tang | G06F 11/1076 |

* cited by examiner

*Primary Examiner* — Yair Leibovich
(74) *Attorney, Agent, or Firm* — BainwoodHuang (57) ABSTRACT

Techniques for data recovery involve: reading target data corresponding to a first logical block from a first data block of a stripe of a RAID system, the target data being a compressed version of data in the first logical block; in accordance with a determination that an error occurs in the target data, reading data from a plurality of second data blocks of the stripe and first parity information from a first parity block of the stripe; comparing respective checksums of the data read from the plurality of second data blocks with a first predetermined checksum and a checksum of the first parity information with a second predetermined checksum; and determining recoverability of the target data based on a result of the comparison. Accordingly, it is possible to simplify the data recovery process, reduce the calculation and time costs in the data recovery, and improve the data recovery efficiency.

31 Claims, 7 Drawing Sheets

FIG. 8 ures. The storage system provides some data recovery mechanism to handle such situation so as to recover the corrupted data. However, there are some deficiencies in the existing data recovery mechanisms and further improvements are desired.

METHODS FOR DATA WRITING AND FOR DATA RECOVERY, ELECTRONIC DEVICES, AND PROGRAM PRODUCTS

CROSS-REFERENCE TO RELATED APPLICATION

This application claims priority to Chinese Patent Application No. CN201911054443.8, on file at the China National Intellectual Property Administration (CNIPA), having a filing date of Oct. 31, 2019, and having "METHODS FOR DATA WRITING AND FOR DATA RECOVERY, ELECTRONIC DEVICES, AND PROGRAM PRODUCTS" as a title, the contents and teachings of which are herein incorporated by reference in their entirety.

FIELD

Embodiments of the present disclosure generally relate to the field of data storage and more specifically, to methods for data writing and for data recovery, electronic devices, and computer program products.

BACKGROUND

In a storage system based on a redundant array of independent disks (RAID), data of logical blocks in a logical storage space are compressed and stored in a physical storage space. The physical storage space is divided into a plurality of stripes, and each stripe includes a plurality of physical blocks which are specifically data blocks and parity blocks. The data blocks are used to store the compressed data of the logical blocks while the parity blocks are used to store parity information for the data stored in the data blocks. A data block may store data in one or more logical blocks. During data storage, data corruption may occur, for example, bit flip may occur in the data. The storage system provides some data recovery mechanism to handle such situation so as to recover the corrupted data. However, there are some deficiencies in the existing data recovery mechanisms and further improvements are desired.

SUMMARY

Embodiments of the present disclosure provide an improved solution for data writing and data recovery.

In a first aspect of the present disclosure, there is provided a method for data recovery. The method includes: reading target data corresponding to a first logical block from a first data block of a stripe of a redundant array of independent disks (RAID) system, the target data being a compressed version of data in the first logical block; in accordance with a determination that an error occurs in the target data, reading data from a plurality of second data blocks of the stripe and first parity information from a first parity block of the stripe; comparing respective checksums of the data read from the plurality of second data blocks with a first predetermined checksum and a checksum of the first parity information with a second predetermined checksum; and determining recoverability of the target data based on a result of the comparison.

In a second aspect of the present disclosure, there is provided a method for data writing. The method includes: in accordance with a determination that target data in a plurality of logical blocks are to be written into a data block of a stripe of a redundant array of independent disks (RAID) system, compressing the target data in the plurality of logical blocks in unit of logical blocks; determining checksum seed data based on the compressed target data such that a checksum of the compressed target data and the checksum seed data is equal to a first predetermined checksum; and writing the compressed target data and the checksum seed data into the data block.

In a third aspect of the present disclosure, there is provided an electronic device. The electronic device includes at least one processor; and at least one memory having computer program instructions stored therein, the at least one memory and the computer program instructions configured to, with the at least one processor, cause the electronic device to perform acts. The acts include: reading target data corresponding to a first logical block from a first data block of a stripe of a redundant array of independent disks (RAID) system, the target data being a compressed version of data in the first logical block; in accordance with a determination that an error occurs in the target data, reading data from a plurality of second data blocks of the stripe and first parity information from a first parity block of the stripe; comparing respective checksums of the data read from the plurality of second data blocks with a first predetermined checksum and a checksum of the first parity information with a second predetermined checksum; and determining recoverability of the target data based on a result of the comparison.

In a fourth aspect of the present disclosure, there is provided an electronic device. The electronic device includes at least one processor; and at least one memory having computer program instructions stored therein, the at least one memory and the computer program instructions configured to, with the at least one processor, cause the electronic device to perform acts. The acts include: in accordance with a determination that target data in a plurality of logical blocks are to be written into a data block of a stripe of a redundant array of independent disks (RAID) system, compressing the target data in the plurality of logical blocks in unit of logical blocks; determining checksum seed data based on the compressed target data such that a checksum of the compressed target data and the checksum seed data is equal to a first predetermined checksum; and writing the compressed target data and the checksum seed data into the data block.

In a fifth aspect of the present disclosure, there is provided a computer program product being tangibly stored on a non-volatile computer readable medium and including computer-executable instructions. The computer-executable instructions, when executed, cause a device to perform the method according to the first aspect.

In a sixth aspect of the present disclosure, there is provided a computer program product being tangibly stored on a non-volatile computer readable medium and including computer-executable instructions. The computer-executable instructions, when executed, cause a device to perform the method according to the second aspect.

It is to be understood that the content of the present disclosure is not intended to limit key features or essential features of embodiments of the present disclosure. Other features of the present disclosure will be readily understood from the following detailed description.

BRIEF DESCRIPTION OF THE DRAWINGS

The above and other objectives, features, and advantages of example embodiments of the present disclosure will become more apparent through the following detailed description with reference to the accompanying drawings. Several example embodiments of the present disclosure will be illustrated in the drawings by way of example without suggesting any limitation, in which.

Throughout the figures, the same or similar reference numerals represent the same or similar components.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles and spirits of the present disclosure will now be described with reference to several example embodiments illustrated in the drawings. It would be appreciated that description of those embodiments is merely for purpose of enabling those skilled in the art to better understand and further implement the present disclosure without suggesting any limitation to the scope disclosed herein in any manner.

Figure 1:
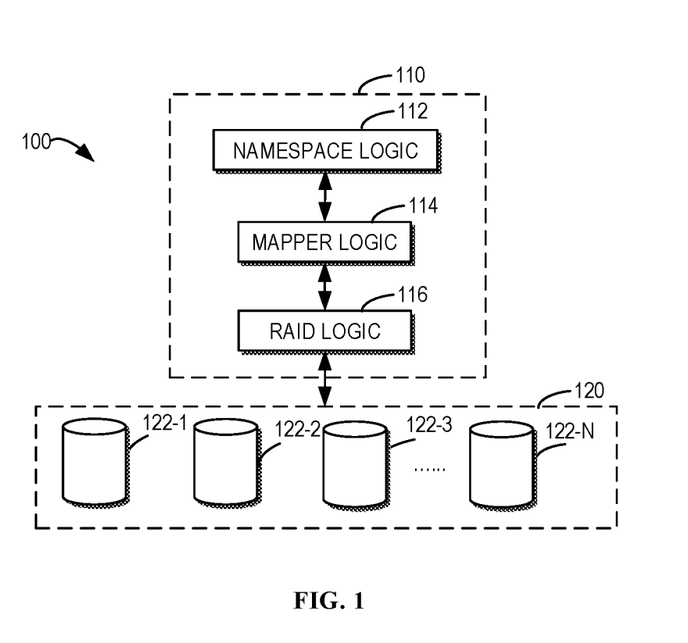
FIG. 1 illustrates a block diagram of an example storage system in which embodiments of the present disclosure can be implemented.

FIG. 1 illustrates a schematic diagram of an example storage system 100 in which embodiments of the present disclosure can be implemented. As shown in FIG. 1, the storage system 100 includes a control node 110 and a hardware storage pool 120.

The control node 110 may include, but is not limited to, a cloud computing device, a mainframe computer, a server, a personal computer, a desktop computer, a laptop computer, a tablet computer, and a personal digital assistant, and any device having a computing capability.

The hardware storage pool 120 includes a plurality of storage disks 122-1, 142-2, 142-3, . . . , 142-N (N is an integer greater than or equal to 1), used to provide a physical storage space of the storage system 100. For ease of discussion, these storage disks are sometimes collectively or individually referred to as storage disks 122. The storage disks 122 may include various types of devices for storage, including, but not limited to, a hard disk drive (HDD), a solid state drive (SSD), a removable disk, a compact disk (CD), a laser disk, an optical disk, a digital versatile disc (DVD), a floppy disk, a blue-ray disk, a Serial Attached Small Computer System Interface (SCSI) Storage Disk (SAS), a Serial Advanced Technology Attached (SATA) Storage Disk, any other magnetic and/or optical storage device, or any combination thereof.

The control node 110 is used to control the hardware storage pool 120, including managing and configuring physical storage resources in the hardware storage pool 120, determining allocation of the physical storage resources, and controlling I/O access to the physical storage resources. The control node 110 may include corresponding logic to implement control of the hardware storage pool 120. The storage system 100 may provide storage based on the Redundant Array of Independent Disks (RAID) technology. In this case, the storage system 100 may also be referred to as a RAID system 100 or a RAID-based storage system 100. In some embodiments, according to the RAID technology, the control node 110 may include namespace logic 112, mapper logic 114, RAID logic 116, and the like.

The RAID logic 116 in the control node 110 organizes the physical storage space of the storage disk 122 with a RAID algorithm. The RAID logic 116 provides a flat physical address space to the mapper logic 114. In the RAID-based storage system, various RAID algorithms may be utilized to organize the physical storage disk 122, including a traditional RAID algorithm and architecture that is currently referred to as RAID 2.0. In some embodiments, the storage disk 122 is divided into a plurality of disk extents or a plurality of disk slices. Such division may be a logical division. The size of each disk extent may be fixed, and this specific size may depend on the size and division manner of the storage disks 122. In some examples, the size of a disk extent may be at a gigabyte level. Certainly, other disk extent sizes are also possible according to actual deployment needs.

In some storage systems with dynamic allocation, upon initial building, all disk extents of the storage disk 122 are free. As data is written, if the capacity is found insufficient, the RAID logic 116 will select a plurality of disk extents from different storage disks 122 with a certain algorithm and form these disk extents as a RAID block (sometimes also referred to as an Uber) with RAID logic. Such a RAID block may be considered as a small RAID because the I/O access and management of this RAID block is similar to a conventional RAID. The structure of the RAID block will be described below with reference to FIG. 2. In some implementations, one or more RAID blocks may also be organized into a storage area, sometimes referred to as a storage tier. The storage area may be provided as a storage space to a user to access and store data.

The mapper logic 114 is log-based logic. The mapper logic 114 is configured to manage a mapping between the physical storage addresses and the logical storage addresses of the storage disks 122 of the storage system 100. The mapper logic 114 provides a flat linear logical address space to the namespace logic 112. In some implementations, the logical address space consists of a large number of logical blocks (sometimes referred to as logical pages). Each logical block may have a fixed size (for example, a size of 4 KB). Each logical block may be mapped to a corresponding physical block (sometimes referred to as a physical page). The mapper logic 114 maintains a mapping from a logical address of each logical block to a physical address of a corresponding physical block.

The namespace logic 112 consumes the logical address space provided by the mapper logic 114 and may provide storage volumes to upstream (e.g., users). The namespace logic 112 may invoke an application program interface (API) of the mapper logic 114 to obtain the logical-physical address mapping to access the corresponding logical blocks. When an I/O operation on the storage system 100 is performed, a I/O request from the user is received by the namespace logic 112 and sent to the mapper logic 114. The mapper logic 114 looks up for the address of the physical block corresponding to the logical block to which the I/O request is directed (the address of the storage space physically used for data storage), and initiates the I/O request to the RAID logic 116, such that the RAID logic 116 performs the actual I/O operation to the storage disk 122 at back end.

It would be appreciated that FIG. 1 only schematically illustrates units, modules, or components in the storage system 100 related to some embodiments of the present disclosure. The components shown in FIG. 1 are only based on the example storage system management architecture. In other RAID-based storage systems, there may be other architecture division manners, other units, modules or components for other functions. Therefore, the embodiments of the present disclosure are not limited to the specific devices, units, modules or components depicted in FIG. 1, but are generally applicable to any RAID technology-based storage system. Various components (other than the storage disks 122) shown in FIG. 1 may be implemented in a single or a plurality of computing devices.

The RAID logic 116 is built with the disk extents as a unit. In some storage systems with dynamic allocation, after RAID logic 116 is initially created, all disk extents are free. As data is written, if the capacity of the RAID is found insufficient, the RAID logic 116 will select a plurality of disk extents from different storage disks 122 with a certain algorithm and form these disk extents into a RAID block with a RAID logic. Such RAID block may be considered as a small RAID because the I/O access and management of the RAID block is similar to a conventional RAID.

Figure 2:
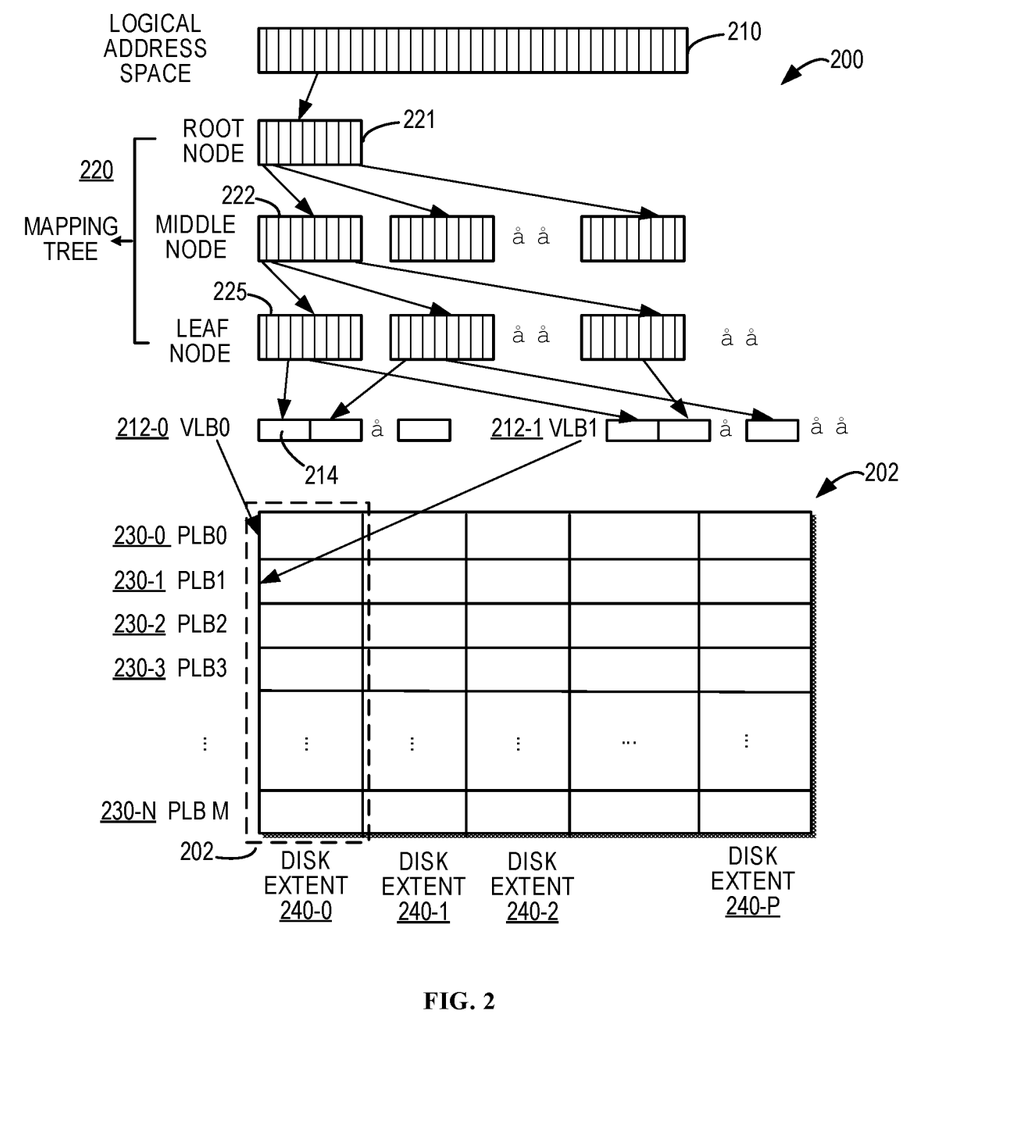
FIG. 2 illustrates a schematic diagram illustrating an example structure of a logical address space and a physical storage space in a RAID in accordance with an embodiment of the present disclosure.

As mentioned above, the mapper logic 114 provides a logical storage space to an upper layer (for example, the namespace logic 112) and maps the logical storage space to the physical storage space of the RAID logic 116. FIG. 2 illustrates an example logical-physical mapping 200 in the mapper logic 114. As shown in FIG. 2, the logical address space 210 is formed by a plurality of logical blocks. Each logical block may have the same size, for example, each logical block may have a size of 4 KB. Certainly, other sizes are also possible. In some implementations, the mapper logic 114 may use a B+tree structure as a mapping tree 220 to direct to logical blocks in the logical address space 210 at a granularity of logical blocks. FIG. 2 shows the mapping tree 220 with an example three-level B+tree structure. It would be appreciated that other levels of tree structures or other types of data structures may also be used to implement the mapping.

As shown in FIG. 2, the mapping tree 220 includes a root node 221, a plurality of middle nodes 222, and a plurality of leaf nodes 225, each node 221, 222, and 225 having a plurality of entries. Each entry includes a corresponding pointer to point to a next entry. The entries in the leaf node 225 point to logical blocks in the logical address space. In an example, each node may include 512 pointers, each pointer pointing to a next-level entry or logical block. Certainly, the number of pointers here is only an example, and other numbers of pointers are also possible. In some implementations, a plurality of logical blocks (as indicated by 214 in FIG. 2) in the logical address space form a larger unit virtual block, referred to as a virtual large block (VLB), such as VLB0 212-0, VLB1 212-1 and so on (sometimes collectively or individually referred to as VLBs 212 or virtual large blocks 212).

In the hardware storage pool 120, a plurality of disk extents 240-0, 240-1, 240-2, . . . , 240-P (collectively or individually referred to as disk extents 240) divided from the storage disks 120 form a RAID block 202. P may be an integer greater than or equal to 2. The P disk extents forming the RAID block 202 may be from different storage disks 120. The RAID block 202 is divided into a plurality of physical large blocks (PLBs) 230-0, 230-1, 230-2, . . . , 230-M (collectively or individually referred to as PLBs 230). M may be an integer greater than or equal to 2.

The VLBs 212 are mapped to the PLBs 230 in the RAID block 202. A PLB 230 may be divided into a plurality of stripes, each including a plurality of physical blocks. In particular, the data structure of the VLB 212 has a mapping from the logical blocks 214 to THE physical blocks in the PLB 230. In some implementations, the size of a logical block 214 may be the same as the size of a physical block. The logical block-physical block mapping and the structure in the PLB 230 will be described in detail below with reference to FIG. 3.

Figure 3:
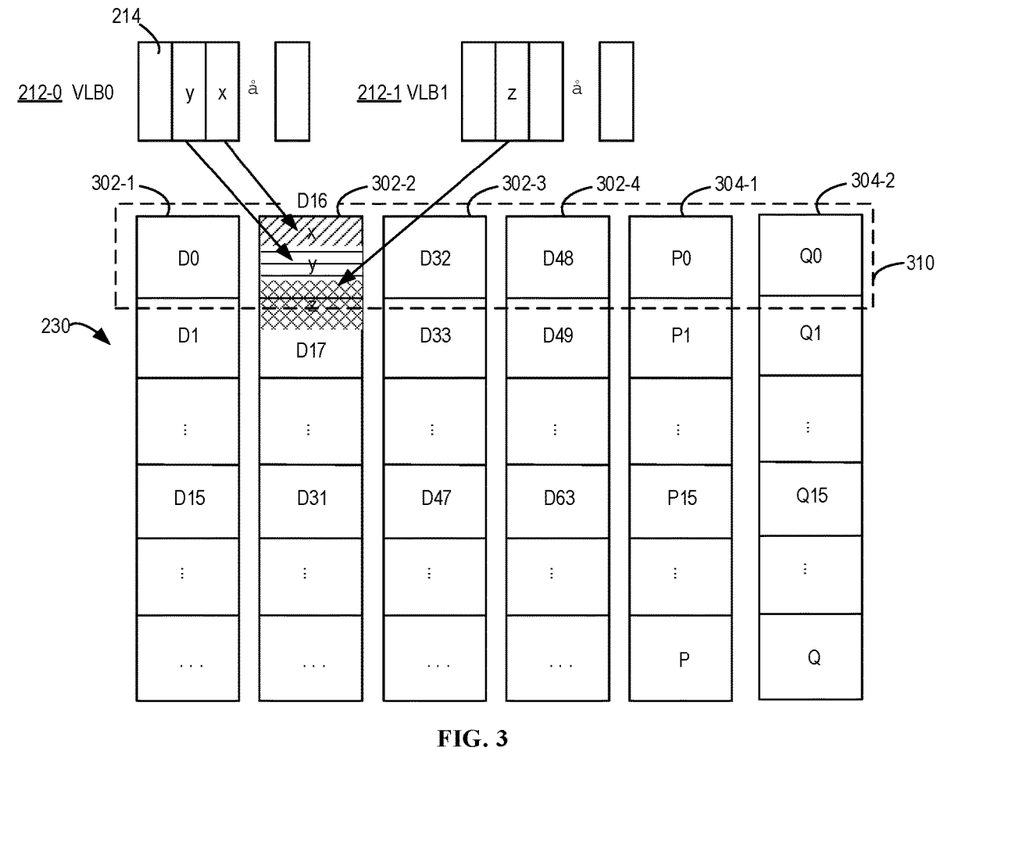
FIG. 3 illustrates a schematic diagram of mapping of logical blocks to physical blocks in a RAID in accordance with an embodiment of the present disclosure.

As shown in FIG. 3, a physical storage space of a PLB 230 in the RAID block 202 is divided into a plurality of stripes 310, and each stripe 310 may have a same size. The stripe 310 may sometimes be referred to as a physical large block (PLB). Each stripe 310 may include a plurality of physical blocks. In some examples, a physical block in the stripe 310 may have a same size as a single logical block in the VLB, for example, 4 KB. Therefore, the size of each stripe may be an integer multiple of the size of a single logical block, for example, an integer multiple of 4 KB.

The number and arrangement manner of the physical blocks in each stripe 310 are based on the specific RAID type. In the example in FIG. 3, a 4+2 RAID 6 type is illustrated as an example. As shown, the stripe 310 includes 6 physical blocks, which are data blocks 302-1, 302-2, 302-3, and 302-4 (collectively or individually referred to as data blocks 302), and parity blocks 304-1 and 304-2 (collectively or individually referred to as parity blocks 304). The data blocks 302 are used to store data, while the parity blocks 304 are used to store parity information of the plurality of data blocks so as to enable reconstruction of the data in the data blocks 302 in the case that the data is corrupted. In FIG. 3, the data blocks of each stripe are represented by a mark beginning with "D", while the parity blocks are represented by a mark beginning with "P".

In a RAID 6 type system, each stripe 310 includes two parity blocks (i.e., parity blocks 304-1 and 304-2), thereby ensuring that the data will not be lost in a case that up to two blocks in the stripe 310 are corrupted. The parity blocks 304-1 and 304-2 are two independent parity information blocks, and may calculate parity information for the data blocks 302-1, 302-2, 302-3, and 302-4 based on different parity algorithms (such as different odd-even check algorithms). For example, the parity information in the parity block 304-1 may be generated using an exclusive OR (XOR) algorithm, for example, obtained by performing an XOR operation on the data in the data blocks 302-1, 302-2, 302-3 and 302-4. The parity block 304-2 may calculate parity information of the data blocks with a different parity algorithm, for example, with a "Galois Field" algorithm. The parity block 304-1 is sometimes referred to as a P parity block, and the parity block 304-2 is sometimes referred to as a Q parity block.

The logical blocks 214 in each virtual block VLB 212 is mapped to the data blocks 302 of the stripe 310. That is, the data that the user wants to store into the logical blocks 214 are physically stored in the physical blocks in the physical storage space, i.e., the data blocks in the stripe (because the parity block stores parity information, not data). Generally, the data in the logical blocks 214 are compressed and stored in the data blocks 302. Therefore, although the size of a data block 302 may be set to be the same as the size of a logical block 214 (for example, 4 KB), data in a logical block 214 may be scaled down after the compression, and thus one data block 302 may store compressed data of two or more logical blocks 214. For purpose of illustration, FIG. 3 shows the data storage in the data block 302. The data block 302 includes compressed data "x", "y" and a portion of data "z" from three logical blocks. The other portion of the data "z" is stored in the data block of a next stripe at the same disk extent in the PLB 230. That is, data of a logical block may be stored across the physical blocks, which can improve physical space utilization.

The mapper logic 114 associates a plurality of VLBs with a single PLB 230, and stores metadata for each logical block 214 within the VLB. Such metadata may include position metadata, such as an offset of a start position of compressed data of the logical block 214 in the PLB 230, a length of the compressed data, a checksum of the original data in the logical block 214 before the compression, an index of PLB 230 in the RAID block 202, and the like. The metadata may further indicate a compression algorithm applied to the data of the logical block 214.

It would be appreciated that FIG. 3 only illustrates an arrangement of stripes based on the RAID 6 type. Stripes of other types of RAID may have other arrangements. In some embodiments, in a RAID established based on other RAID types, each stripe may have a different number of physical blocks for storing parity information. For example, in a RAID based on RAID 5 type, each stripe may include 4 data blocks and 1 parity block. Such a stripe can ensure that the data is not lost in a case that one physical block of the stripe is corrupted.

It will be appreciated that the embodiments of the present disclosure are not limited to the specific values and specific data structures described above. In other embodiments, the size and division granularity of the logical address space and the size and division granularity of the physical address space may be set to any appropriate values, and the mapper logic 114 may employ other suitable data structures to maintain the mapping between the logical address and the physical address.

It should be appreciated that the RAID storage system described above with reference to FIG. 1 to FIG. 3 is only for purpose of better understanding the RAID structure. In actual use, different RAID systems may organize the physical storage space and logical storage space in different ways. Generally speaking, a strip is a base unit of a RAID, and each strip is composed of a plurality of physical blocks, including data blocks for storing data and parity blocks for storing parity information. The data/information in the logical blocks of the RAID are stored into physical blocks.

During data storage, data corruption may occur, for example, bit flip may occur in the data. When the control node (for example, the mapper logic in the control node) reads data from the stripe, it tries to decompress the data that is read. During this process, the data decompression failure may occur; or although the decompression is successful, the checksum of the decompressed data does not match the checksum for the logical block that is stored in the VLB. The occurrence of both cases indicates that the read data is incorrect. That is, data corruption occurs or the stripe is inconsistent.

Generally, in RAID, if data corruption occurs, it may try to reconstruct the data. However, because the checksum of the uncompressed data in the logical blocks is stored in the metadata of the VLB and the control node has no checksum of the compressed data in the data blocks, it is difficult to accurately determine which data block in the stripe is incorrect.

In this case, a conventional solution is to attempt to perform the verification under various assumptions. For example, it may assume that data/information in one or more data blocks and/or parity blocks in a stripe are corrupted, and then use the parity information in the parity block to reconstruct the data. The data is usually read in unit of logical block. As mentioned above, when stored in the physical space, compressed data of the logical block may be stored across physical blocks. For example, the data "z" in FIG. 3 is divided into two data portions which are stored in two data blocks in two stripes. In order to reconstruct the data, data reconstruction will need to be performed in two different stripes respectively to determine the two data portions, and attempt to decompress each combination of the two data portions is also required so to obtain the data of the logical block. For the RAID 5 type, since there is only one parity block, the maximum number of attempts is three. The reason is that in RAID 5, to enable reconstruction of the data, the parity information of the parity block should be assumed as correct.

However, in a RAID where the stripe has more parity blocks (or supporting corruption of two or more physical blocks), such as in a RAID 6 where the stripe has two parity blocks, the conventional solution will lead to a very complicated attempt process. Since in the RAID 6 where the stripe has two parity blocks, corruption of two physical blocks is supported in each stripe; that is, if one data block and one parity block are corrupted, the other parity block can still be used to reconstruct the data. Therefore, more attempts have to be made. Take a more complicated data storage situation as an example. For example, the data "z" is stored across physical blocks in FIG. 3. In this case, it is necessary to assume that errors occur in the first data portion, the second data portion, and both the data portions of the data "z", respectively. In the case where it is assumed that an error occurs in the first data portion of the data "z", it needs to further assume that a certain data block or parity block in the single stripe is corrupted. Therefore, in the worst case, it needs to try the number of times equal to the width of the stripe to recover a single data portion when it is assumed that an error only occurs in a single data portion, where the width of the strip refers to the number of physical blocks in the stripe. If both the data portions stored across the physical blocks are corrupted, it needs to first attempt to reconstruct the individual data portions, respectively. To enumerate all the possible combinations, a total number of attempts to be made is a product of the widths of the stripes.

Therefore, in order to recover logical block data stored across physical blocks, the control node needs to attempt (width+2)*width times in the worst case. In each attempt, it is necessary to decompress the data and perform comparison with a checksum in the VLB. For the 4+2 RAID 6, it may need to attempt to decompress up to 48 times to detect the position of the error in the stripe in which the error occurs. For a 16+2 RAID 6 (that is, each stripe includes 16 data blocks and 2 parity blocks), the number of times of decompression will reach 360 times. For data distributed only in a single data block, such as the data "x" and "y" in FIG. 3, it is still necessary to try the number of times equal to the width of the stripe.

Therefore, the complexity brought by such an attempt method will consume more computing resources and prolong the time for data recovery. The inventors discover that if a physical block(s) (a data block(s) or a parity block(s)) of the stripe where errors occur can be determined more accurately, the complexity, resource consumption, and time cost of the data recovery will be greatly reduced.

According to example embodiments of the present disclosure, to improve the data recovery process of RAID, instead of directly calculating a checksum from compressed data stored in the data blocks of the stripe, it is proposed to write checksum seed data into data blocks of a stripe such that a checksum of the checksum seed data and the data to be stored in the data blocks is fixed, e.g., to be a predetermined checksum. In this way, the data blocks of the stripe store not only the compressed data of the plurality of logical blocks but also the checksum seed data.

In the case of reading data, if it is found that an error occurs in data corresponding to a logical block read from the data blocks of the stripe (for example, the decompression fails or the checksum of the decompressed data does not match a pre-stored checksum), then data is read from other data blocks of the stripe and parity information is read from the parity block. The checksum for each data block in other data blocks is compared with a predetermined checksum, and the checksum for the parity block is compared with a further predetermined checksum. Based on a result of the comparison, the control node can determine whether the target data can be recovered and how it is recovered.

In this way, it is possible to simplify the data recovery process for RAID, especially the data recovery process for RAID in which a stripe has a plurality of parity blocks, reduce the calculation and time overhead of the data recovery, and improve the data recovery efficiency.

Hereinafter, example embodiments of the present disclosure will be described in detail with reference to the figures.

Figure 4:
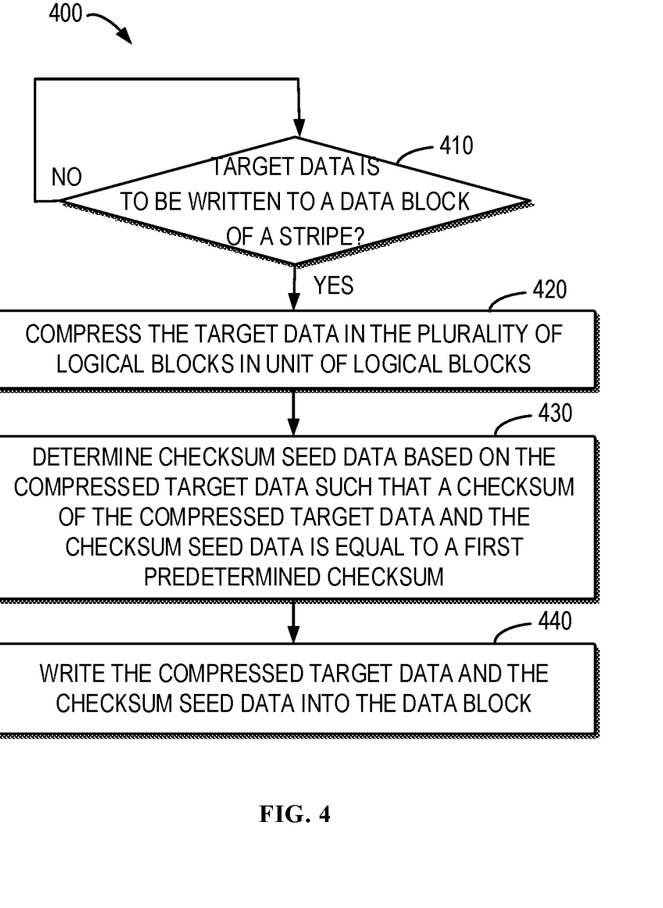
FIG. 4 illustrates a flowchart of a process for data writing in accordance with some embodiments of the present disclosure.

FIG. 4 illustrates a flowchart of a process 400 of data writing according to embodiments of the present disclosure. In some embodiments, the process 400 may be implemented as a data write to the storage system 100. For ease of description, reference will be made to the storage system architecture and the detailed structure of the RAID therein as shown FIG. 1 to FIG. 3. However, it would be appreciated that although the example embodiments of the present disclosure are discussed based on RAID 6, the process 400 may not be limited to the application illustrated in FIG. 1-FIG. 3, but may be applied to any other suitable types of RAID. In some embodiments, the process 400 may be implemented by a control node 110 of the storage system 100.

At 410, the control node 110 determines whether to write target data in a plurality of logical blocks 214 to a data block 302 of the stripe 310 of the RAID system 100. The control node 110 may continue detect data writing to data blocks 302 of the stripe 310.

If it is determined that the target data is to be written to a certain data block 302 in the stripe 310, at 420, the control node 110 compresses the target data in the plurality of logical blocks 214 in units of logical blocks. A checksum of target data in each logical block 214 before the compression is stored as metadata for the logical block 214, for example, stored in a data structure of a VLB mapped to the PLB where the stripe is located. The control node 110 may compress the target data of the logical blocks 214 according to various compression algorithms. Depending on the compression algorithm used and the specific type of target data, the compression rate may be different.

In some embodiments, the compressed data of one logical block 214 of the plurality of logical blocks 214 may be only partially stored in the current data block 302, and the other part is stored in a data block 302 in another stripe in the same disk extent. An example may refer to the data "z" in FIG. 3. In other examples, after the compression, the compressed target data of two or more logical blocks 214 may be completely written into one data block 302.

At 430, the control node 110 determines checksum seed data based on the compressed target data, such that a checksum of the compressed target data and checksum seed data is equal to a predetermined checksum (referred to as a "first predetermined checksum" for ease of discussion). According to example embodiments of the present disclosure, in order to improve the subsequent data recovery process, in the data writing process, the checksum seed data is additionally written in each data block of the stripe. The checksum seed data is not a checksum obtained through direct calculation on the compressed target data to be stored in the data block 302. In the example embodiments of the present disclosure, the checksum seed data is to be calculated such that a checksum of the compressed target data and the checksum seed data is a fixed value, i.e., the first predetermined checksum. Various checksum calculation methods may be employed to determine the checksum of the compressed target data and the checksum seed data.

The first predetermined checksum may be any checksum value. In some embodiments, a storage space for storing the checksum seed data may be reserved in the data block 302, for example, represented by data of a 16-byte or 32-byte size. The control node 110 may first set an initial value of the checksum seed data to 0. Then, the checksum seed data is determined based on the compressed target data to be written and the first predetermined checksum. For example, in a case where the checksum is calculated based on odd-even check, the checksum seed data may be determined in the following manner: Seed=$CHECKSUM_{VALUE} \hat{} D0 \hat{} D1 \hat{} \ldots \hat{} Dx-1 \hat{} Dx$, where Seed represents the checksum seed data, $CHECKSUM_{VALUE}$ represents the first predetermined checksum, and Di represents the data of the logical blocks 214 to be stored in the $i^{th}$ data block 302. The function of the checksum seed data in the data block 302 is used to calculate the first predetermined checksum.

At 440, the control node 110 writes the compressed target data and the checksum seed data into the data block 302.

In some embodiments, for each data block 302 in the plurality of data blocks 302 of the stripe 310, the control node 110 writes the compressed target data from the logical blocks 214 and the calculated checksum seed data through the process 400. According to the above discussion, the checksum seed data written in each of the data blocks 302 may be different, but the checksums of all the data (including the compressed target data and the checksum seed data) written into the data blocks 302 are all a fixed value, i.e., the first predetermined checksum.

By adding checksum information to each physical block of the stripe to indicate the checksum of the data/parity information stored in the physical block, when an error in the data is found, it is possible to locate a physical block where the error occurs by first verifying whether the checksum of the data/parity information in each physical block is correct, without performing various enumerations. This will be explained in detail through the data recovery process discussed below.

One problem concerned with the checksum seed data is how to place it in the data block. The inventors discover that various problems will rise if the checksum generated based on the data is directly added into the physical block. A first problem is in which position of the physical block the checksum is written. As the size of data of each logical block is not fixed after the compression, the compressed data of some logical blocks may cross the boundaries of the data blocks. If the checksum is added to the end of the data block, data of a certain logical block may be split into two portions across the data blocks. For example, in FIG. 3, if the checksum of the data stored from the data block 302-2 is placed at the end of the data block 302-2, the data "z" is divided into two sections in the corresponding disk extent. When the control node tries to read the data "z", it needs to first read out the data of the two sections and put the data into a continuous storage space of the memory, and then decompress the data. Therefore, this results in additional data movement overhead for the I/O access.

Figure 5:
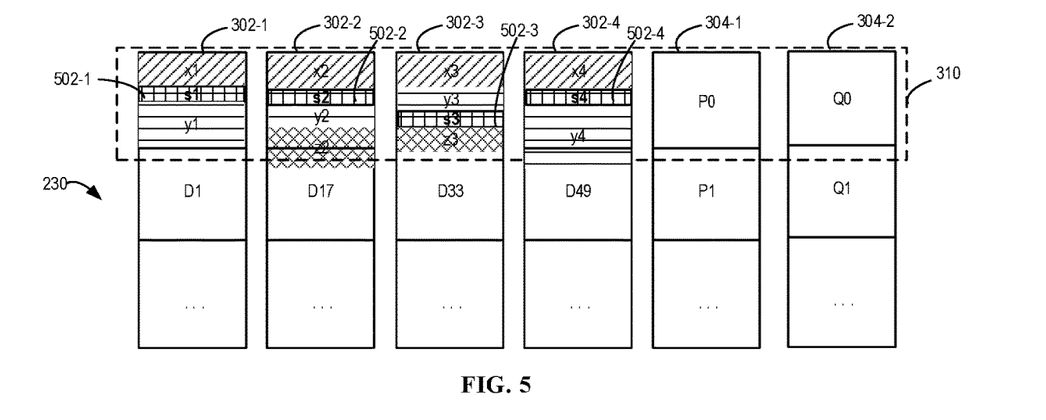
FIG. 5 illustrates an example of writing data in data blocks of a stripe in accordance with some embodiments of the present disclosure.

In some embodiments, the checksum seed data may be stored between the boundaries of the compressed target data of two logical blocks 214. After the compression, the compressed target data of each logical block 214 may be written into the data block 302 one by one. In some embodiments, the size of the data block 302 may be greater than or equal to the size of the logical block 214, so after the compression, the data of two or more logical blocks 214 may be placed into the data block 302, and therefore it is possible to place the checksum seed data between data of the two logical blocks 214. Placing the checksum seed data in this manner will help improve the subsequent data reading work.

FIG. 5 illustrates an example of writing data in data blocks of a stripe 310 in accordance with some embodiments of the present disclosure. As shown in FIG. 5, in addition to the compressed data from the logical blocks, each of the data blocks 302-1, 302-2, 302-3 and 302-4 further stores the respective checksum seed data 502-1 (represented as "s1"), 502-2 (represented as "s2"), 502-3 (represented as "s3"), 502-4 (represented as "s4"), collectively or individually referred to as checksum seed data 502.

Since data may also be corrupted in the parity block 304 in the stripe 310 during data storage, resulting in an error in the parity information stored therein. If the erroneous parity information is used to reconstruct the data, this may also cause data errors. Therefore, it is expected that the parity block 304 also has a corresponding checksum. In some embodiments, a parity block may have the parity information determined through the XOR operation, for example, a P parity block 304-1 in a RAID 6 type stripe has the parity information obtained by performing the XOR operation for the data stored in the plurality of data blocks 302. Therefore, since the calculation and writing of the checksum seed data and the checksum of each data block 302 in the stripe 310 is a fixed value, the checksum of the parity information stored in the P parity block 304-1 depends on the number of the plurality of data blocks in the stripe 310 and therefore may also be also a fixed value, i.e., a second predetermined checksum. Specifically, when the number of the plurality of data blocks 302 is an even number, the second predetermined checksum of the P parity block 304-1 is zero. When the number of the plurality of data blocks is an odd number, the second predetermined checksum of the P parity block 304-1 is the same as the first predetermined checksum, which is also a fixed value. Generally, in many RAID systems, the number of data blocks in the stripe is set to an even number, so the second checksum of the P parity block will be zero.

Figure 6:
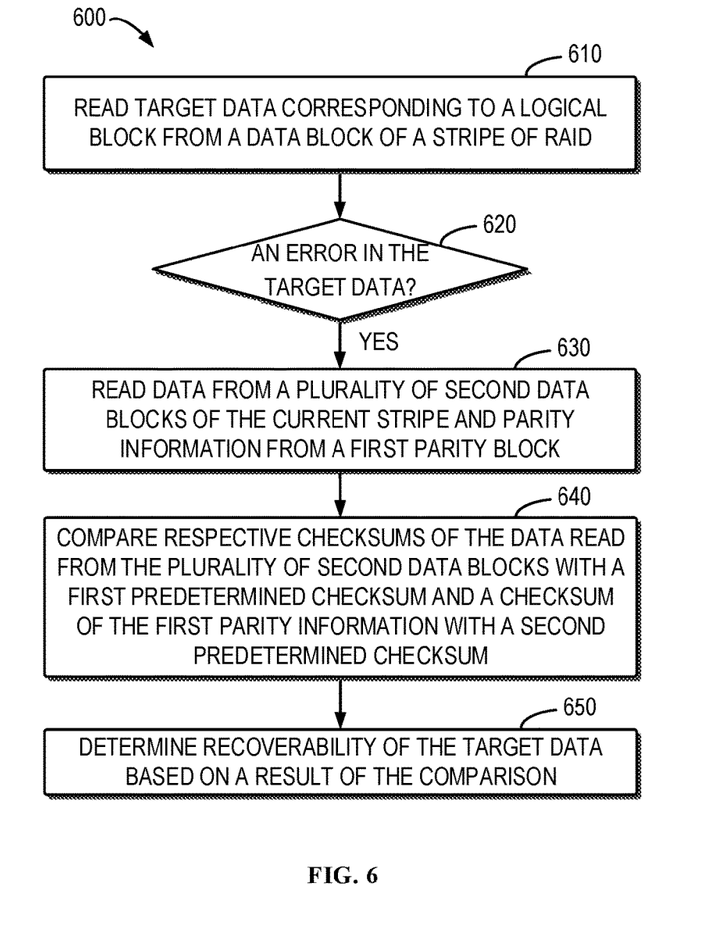
FIG. 6 illustrates a flowchart of a process for data recovery in accordance with some embodiments of the present disclosure.

After the data is written in the stripe 310, if data is found corrupted during the data reading process, the checksum seed data may be used to improve the data recovery process. This will be described below with reference to FIG. 6. FIG. 6 illustrates a flowchart of a process 600 of data recovery in accordance with some embodiments of the present disclosure. In some embodiments, the process 600 may be implemented as the data recovery process for the storage system 100. For ease of description, reference will be made below to the storage system architecture and the detailed structure of the RAID therein as shown FIG. 1 to FIG. 3. However, it would be appreciated that although the example embodiments of the present disclosure are discussed based on the RAID 6, the process 600 may not be limited to the application illustrated in FIG. 1-FIG. 3, but may be applied to any other suitable types of RAID. In some embodiments, the process 600 may be implemented by the control node 110 of the storage system 100.

At 610, the control node 110 reads target data corresponding to a logical block 214 from a data block 302 of a stripe 310 of the RAID system 100. For ease of discussion, the data block 302 from which the target data is expected to be read is referred to as a first data block 302, and the logical block 214 corresponding to the target data is referred to as a first logical block 214. The target data stored in the first data block 302 is usually a compressed version of the data in the first logical block 214.

At 620, the control node 110 determines whether an error occurs in the read target data, that is, whether data corruption or stripe inconsistency occurs. The error in the target data may be caused by bit flip occurring during the storage. Such an error in the data may cause the control node 110 failing to decompress the read target data or determining that the checksum of the decompressed target data after the decompression does not match the checksum pre-stored with respect to the first logical data 214. Each time when the data is read, the control node 110 may read the data of one or more logical blocks 214. However, since the control node 110 stores a checksum of the uncompressed original data corresponding to each logical block 214, the control node 110 may determine whether an error occurs in the data in each logical block 214 at this time.

If an error is not found in the data, the data read this time will be completed successfully. If an error is found in the target data, the control node 110 needs to initiate a data recovery process to attempt to recover the wrong target data. Therefore, after determining that the error occurs in the target data, at 630, the control node 110 reads data from a plurality of other data blocks 302 of the current stripe 310 and reads parity information from a parity block 304. For ease of description, data blocks other than the first data block are referred to as second data blocks, and the parity block to be read is referred to as a first parity block 304, and the parity information therein is referred to as first parity information.

At 640, the control node 110 compares respective checksums of the data read from the plurality of second data blocks 302 with the first predetermined checksum and compares a checksum of the first parity information with the second predetermined checksum. As described above with reference to FIG. 4, in the data writing process, the checksum seed data is additionally calculated for each data block and the calculated checksum seed data is written into the corresponding data block, thereby ensuring that the checksum of all data read from the data block is the first predetermined checksum. Since the checksum seed data is added into the data block in such a way, the checksum in the parity block may also be a fixed value, especially for a parity block that determines the parity information by performing the XOR operation on the data in the data block, for example, the P parity block 304-1. It is noted that the parity algorithm sampled by the Q parity block 304-2 may not be the XOR algorithm, the checksum of the Q parity block 304-2 may be unknown. Therefore, the first parity block read only by the control node 110 is an XOR operation-based P parity block 304-1 in the strip 310.

At 650, the control node 110 determines recoverability of the target data based on a result of the comparison. Since the correct checksum (i.e., the first predetermined checksum) of each data block 302 and the correct checksum (i.e., the second predetermined checksum) of the parity block 304 are known in advance, it is easier to determine the error occurs in the data in which data block and/or parity block (e.g., determine through the mismatch of the checksum) by comparing the checksums of the data/information in the data block 302 and parity block 304 with the corresponding correct checksums. The control node 110 may determine whether the data in the first data block 302 may be recovered and how to recover it based on different results of the comparison.

Figure 7:
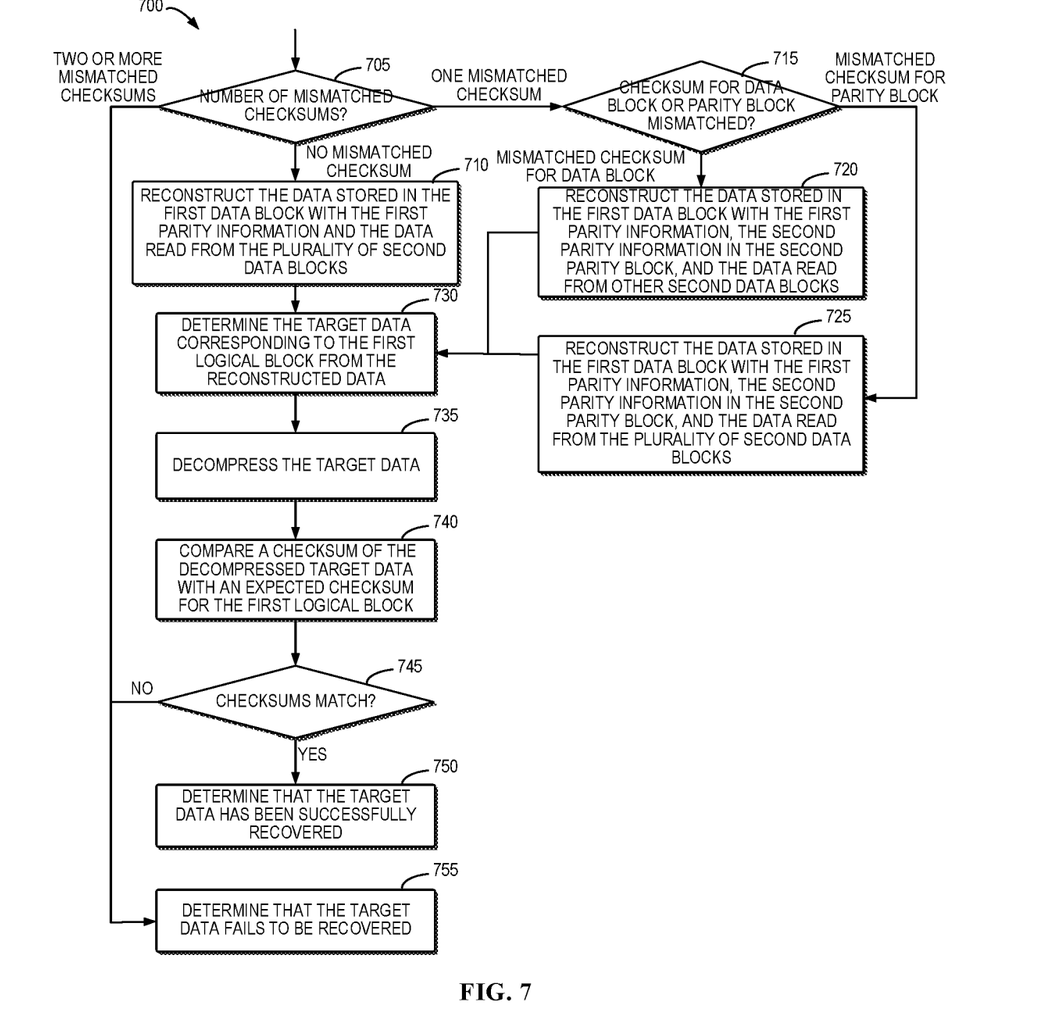
FIG. 7 illustrates a flowchart of a process of determining recoverability of target data in accordance with some embodiments of the present disclosure.

FIG. 7 illustrates a flowchart of a process of determining the recoverability of target data in accordance with some embodiments of the present disclosure. As shown, at 705, the control node 110 determines the number of mismatched checksums after the comparison at 640 of the process 600.

If it is determined that there is no mismatched checksum, i.e., the respective checksums of the data read from the plurality of second data blocks 302 matches the first predetermined checksum and the checksum of the first parity information also matches the second predetermined checksum, it means that an error may occur only in the data of the first data block 302 in the stripe 310, and the first parity information of the first parity block 304 is also correct. In this case, at 710, the control node 110 reconstructs the data stored in the first data block 302 with the first parity information and the data read from the plurality of second data blocks 302.

If it is determined that there is one mismatched checksum after the comparison, at 715, the control node 110 determines whether the checksum for a second data block 302 is mismatched or the checksum for the first parity block 304 is mismatched, i.e., to determine whether the checksum of the data read from one of the plurality of second data blocks 302 mismatches the first predetermined checksum or the checksum of the first parity information mismatches the second predetermined checksum. If it is determined that the checksum of the second data block 302 mismatches, it means that the checksum of the data read from the other data blocks 302 in the plurality of second data blocks 302 matches the first predetermined checksum, and the checksum of the first parity information matches the second predetermined checksum. In this case, at 720, the control node 110 reconstructs the data stored in the first data block 302 with the first parity information, the second parity information in the second parity block 304, and the data read from other second data blocks 302 except the one where its checksum mismatches. In this case, although the second parity information of the second parity block 304 is used, the second parity information used in fact has not been verified by the checksum, and its correctness cannot be guaranteed. However, the reconstructed data may be verified further in a next round of verification, which will be discussed further below.

If it is determined that there is one mismatched checksum after the comparison, at 715, the control node 110 determines that the checksum for the first parity block 304 mismatches. This means that the respective checksums of the data read from the plurality of second data blocks matches the first predetermined checksum, but the first parity information is definitely wrong and cannot be used. In this case, at 725, the control node 110 reconstructs the data stored in first data block 302 with the second parity information of the second parity block 304 and data read from the plurality of second data blocks 302. Similarly, in this case, although the second parity information of the second parity block 304 is used, the second parity information used in fact has not been verified by the checksum, and its correctness cannot be guaranteed. However, the reconstructed data may also be verified further in a next round of verification, which will be discussed further below.

At 730, the control node 110 determines the target data corresponding to the first logical block 214 from the reconstructed data. Because the information used for reconstructing the data may not be guaranteed to be accurate during the different data reconstruction processes (for example, at operations 720 and 725), further verification is needed to determine that the reconstructed data is correct. The data reconstructed in 710 is believed to be correct because the used verification information and data have passed the verification of their respective checksums, although a second verification may further ensure its accuracy. Certainly, in some embodiments, the data reconstructed at 710 may not go through the verification of steps 740 to 750.

Specifically, at 735, the control node 110 decompresses the target data to obtain the decompressed target data. Then, at 740, the control node 110 compares the checksum of the decompressed target data with an expected checksum for the first logical block 214. This expected checksum is calculated and stored before the original data in the first logical block 214 is decompressed in the data writing phase, for example, stored in the data structure of the VLB 212.

At 745, the control node 110 determines whether a checksum of the decompressed target data matches the expected checksum for the first logical block 214. If it is determined that the checksums match with each other, at 750, the control node 110 determines that the target data has been successfully recovered. If it is determined that the checksums mismatch with each other, at 755, the control node 110 determines that the target data fails to be successfully recovered.

In some embodiments, it is possible to verify all other data logical blocks in the first data block 302 reconstructed at 710, 720, and 725 of the process 700 in addition to performing verification on the target data corresponding to the currently read first logical block 214.

In some embodiments, if the control node 110 determines at 705 that two or more checksums mismatch, such a mismatch may be a mismatch between the checksum of the data in one or more second data blocks 302 and the first predetermined checksum, and/or a mismatch between the checksum of the first parity information of the first parity block 304 and the second predetermined checksum. In this case, the control node 110 directly determines, at 755, that the target data fails to be successfully recovered.

According to the process 700, it can be seen that the data recovery process is simplified. Whether the target data may be recovered and how to recover can be determined after a fewer times of decision, reconstruction, and decompression.

Figure 8:
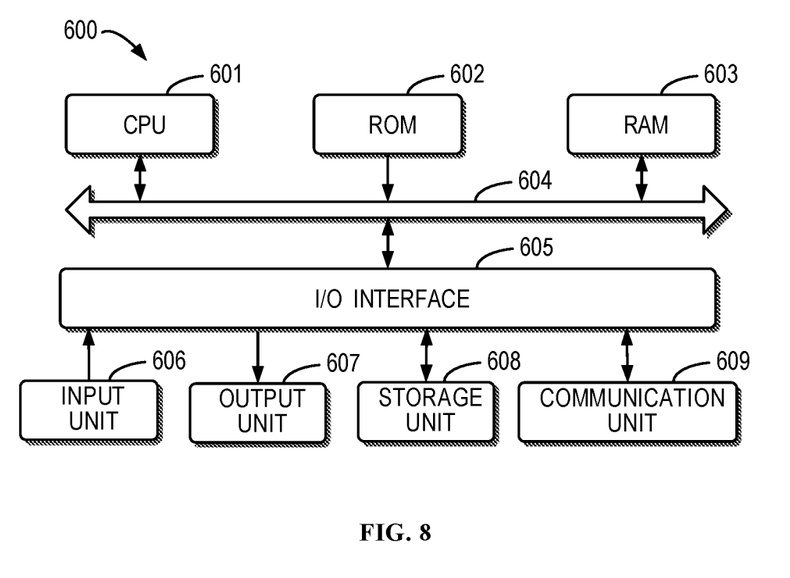
FIG. 8 illustrates a schematic block diagram of a device that can be used to implement embodiments of the present disclosure.

FIG. 8 illustrates a schematic block diagram of a device 800 that can be used to implement embodiments of the present disclosure. The device may be implemented as or included in the control node 110 in FIG. 1.

As shown in FIG. 8, the device 800 includes a central processing unit (CPU) 801 which can perform various appropriate actions and processing according to computer program instructions stored in a read-only memory (ROM) 802 or loaded to a random access memory (RAM) 803 from a storage section 808. The RAM 803 can also store various programs and data required by the operations of the device 800. The CPU 801, ROM 802 and RAM 803 are connected to each other via a bus 804. An input/output (I/O) interface 805 is also connected to the bus 804.

The following components in the device 800 are connected to the I/O interface 805: an input unit 806 such as a keyboard, a mouse and the like; an output unit 807 including various kinds of displays and a loudspeaker, etc.; a memory unit 808 including a magnetic disk, an optical disk, and etc.; a communication unit 809 including a network card, a modem, and a wireless communication transceiver, etc. The communication unit 809 allows the device 800 to exchange information/data with other devices through a computer network such as the Internet and/or various kinds of telecommunications networks.

Various processes and processing described above, e.g., the process 400, the process 600, and/or the process 700 may be performed by the processing unit 801. For example, in some embodiments, the process 400, the process 600, and/or the process 700 may be implemented as a computer software program that is tangibly contained in a machine readable medium, e.g., the storage unit 808. In some embodiments, part or all of the computer program may be loaded and/or installed onto the device 800 via ROM 802 and/or the communication unit 809. When the computer program is loaded to the RAM 803 and executed by the CPU 801, one or more steps of at least one of the process 400, the process 600, and/or the process 700 as described above may be executed.

As used herein, the term "comprise" and its variants are to be read as open-ended terms that mean "comprise, but is not limited to." The term "based on" is to be read as "based at least in part on." The terms "one example embodiment" and "an example embodiment" are to be read as "at least one example embodiment." The terms "first", "second" and the like may refer to different or the same objects. Other definitions, either explicit or implicit, may be included below.

As used herein, the term "determining" encompasses a wide variety of actions. For example, "determining" can include computing, computing, processing, deriving, investigating, looking up (e.g., looking up in a table, database, or another data structure), ascertaining, and the like. Further, "determining" can include receiving (e.g., receiving information), accessing (e.g., accessing data in memory), and the like. Further, "determining" may include parsing, selecting, selecting, establishing, and the like.

It will be noted that the embodiments of the present disclosure can be implemented in software, hardware, or a combination thereof. The hardware part can be implemented by special-purpose logic; the software part can be stored in a memory and executed by a suitable instruction execution system such as microprocessors or special-purpose hardware. Those ordinary skilled in the art can understand that the above method and system may be implemented with computer executable instructions and/or in processor-controlled code, for example, the code provided on a carrier medium such as an optical or electronic signal bearer.

Further, although operations of the present methods are described in a particular order in the drawings, it does not require or imply that these operations are necessarily performed according to this particular sequence, or a desired outcome can only be achieved by performing all shown operations. By contrast, the execution order for the steps as depicted in the flowcharts may be varied. Alternatively, or in addition, some steps may be omitted, a plurality of steps may be merged into one step, or a step may be divided into a plurality of steps for execution. In practice, according to the embodiments of the present invention, the features and functions of two or more units described above may be embodied in one unit. In turn, the features and functions of one unit described above may be further embodied in more units.

Although the present disclosure has been described with reference to various embodiments, it would be appreciated that the present disclosure is not limited to the disclosed embodiments. The present disclosure is intended to cover various modifications and equivalent arrangements included in the spirit and scope of the appended claims.

We claim:

1. A method for data recovery, comprising:
   reading target data corresponding to a first logical block from a first data block of a stripe of a redundant array of independent disks (RAID) system, the target data being a compressed version of data in the first logical block;
   in accordance with a determination that an error occurs in the target data, reading data from a plurality of second data blocks of the stripe and first parity information from a first parity block of the stripe;
   comparing respective checksums of the data read from the plurality of second data blocks with a first predetermined checksum and a checksum of the first parity information with a second predetermined checksum; and
   determining recoverability of the target data based on a result of the comparison.

2. The method of claim 1, wherein determining the recoverability of the target data comprises:
   in accordance with a determination that the respective checksums of the data read from the plurality of second data blocks matches the first predetermined checksum and the checksum of the first parity information matches the second predetermined checksum, reconstructing data stored in the first data block with the first parity information and the data read from the plurality of second data blocks; and
   determining the target data corresponding to the first logical block from the reconstructed data.

3. The method of claim 1, wherein the stripe further comprises a second parity block, the second parity block storing second parity information, and wherein determining the recoverability of the target data comprises:
   in accordance with a determination that the checksum of the data read from only one of the plurality of second data blocks mismatches the first predetermined checksum and the checksum of the first parity information mismatches the second predetermined checksum, reconstructing the data stored in the first data block with the first parity information, the second parity information, and data read from other second data blocks of the plurality of second data blocks; and determining the target data corresponding to the first logical block from the reconstructed data.

4. The method of claim 3, wherein determining the recoverability of the target data comprises:

in accordance with a determination that the result of comparison indicates that two or more checksums mismatch, determining that the target data fails to be recovered.

5. The method of claim 1, wherein the stripe further comprises a second parity block, the second parity block storing second parity information, and wherein determining the recoverability of the target data further comprises:

in accordance with a determination that the respective checksums of the data read from the plurality of second data blocks matches the first predetermined checksum and the checksum of the first parity information mismatches the second predetermined checksum, reconstructing the data stored in the first data block with the second parity information and the data read from the plurality of second data blocks; and determining the target data corresponding to the first logical block from the reconstructed data.

6. The method of claim 1, wherein determining the recoverability of the target data further comprises:

after the target data in the first data block is reconstructed, decompressing the target data;

comparing a checksum of the decompressed target data with an expected checksum for the first logical block;

in accordance with a determination that the checksum of the decompressed target data matches the expected checksum, determining that the target data has been successfully recovered; and in accordance with a determination that the checksum of the decompressed target data mismatches the expected checksum, determining that the target data fails to be recovered.

7. The method of claim 1, wherein each of the plurality of second data blocks stores compressed data from a plurality of second logical blocks and checksum seed data, the checksum seed data being stored between boundaries of the compressed target data of two of the plurality of logical blocks.

8. The method of claim 1, wherein the first parity information is obtained by performing an XOR operation on data stored in the first data block and the plurality of second data blocks, and wherein the second predetermined checksum is zero in a case that the number of data blocks of the stripe is an even number, and the second predetermined checksum is the same as the first predetermined checksum in a case that the number of data blocks of the stripe is an odd number.

9. The method of claim 1, wherein the RAID system is a RAID 6 type storage system, and the stripe comprises two parity blocks.

10. The method of claim 1, further comprising:

reading, from the plurality of second data blocks, checksum seed data of the data from the plurality of second data blocks;

calculating, using the checksum seed data, the respective checksums of the data read from the plurality of second data blocks; and calculating the checksum of the first parity information based on the respective checksums of the data read from the plurality of second data blocks.

11. A method for data writing, comprising:

in accordance with a determination that target data in a plurality of logical blocks are to be written into a data block of a stripe of a redundant array of independent disks (RAID) system, compressing the target data in the plurality of logical blocks in unit of logical blocks;

determining checksum seed data based on the compressed target data such that a checksum of the compressed target data and the checksum seed data is equal to a first predetermined checksum; and writing the compressed target data and the checksum seed data into the data block.

12. The method of claim 11, wherein writing the compressed target data and the checksum seed data into the data block comprises:

storing the checksum seed data between boundaries of the compressed target data of two of the plurality of logical blocks.

13. The method of claim 11, wherein the stripe comprises a plurality of data blocks for storing data, the data block being included in the plurality of data blocks, and a checksum of data stored in the plurality of data blocks is equal to the first predetermined checksum, and wherein the stripe comprises a plurality of parity blocks, and parity information stored in a first parity block of the plurality of parity blocks is obtained by performing an XOR operation on the data stored in the plurality of data blocks, a checksum of the parity information is a second predetermined checksum which is determined based on the number of the plurality of data blocks.

14. The method of claim 13, wherein the second predetermined checksum is zero in a case that the number of the plurality of data blocks is an even number, and the second predetermined checksum is the same as the first predetermined checksum in a case that the number of the plurality of data blocks is an odd number.

15. The method of claim 11, wherein the RAID system is a RAID 6 type storage system, and the stripe comprises two parity blocks.

16. An electronic device, comprising:

at least one processor; and at least one memory having computer program instructions stored therein, the at least one memory and the computer program instructions being configured to, with the at least one processor, cause the electronic device to perform acts comprising:

reading target data corresponding to a first logical block from a first data block of a stripe of a redundant array of independent disks (RAID) system, the target data being a compressed version of data in the first logical block;

in accordance with a determination that an error occurs in the target data, reading data from a plurality of second data blocks of the stripe and first parity information from a first parity block of the stripe;

comparing respective checksums of the data read from the plurality of second data blocks with a first predetermined checksum and a checksum of the first parity information with a second predetermined checksum; and determining recoverability of the target data based on a result of the comparison.

17. The electronic device of claim 16, wherein determining recoverability of the target data comprises:
in accordance with a determination that the respective checksums of the data read from the plurality of second data blocks matches the first predetermined checksum and the checksum of the first parity information matches the second predetermined checksum, reconstructing data stored in the first data block with the first parity information and the data read from the plurality of second data blocks; and
determining the target data corresponding to the first logical block from the reconstructed data.

18. The electronic device of claim 16, wherein the stripe further comprises a second parity block, the second parity block storing second parity information, and wherein determining the recoverability of the target data comprises:
in accordance with a determination that the checksum of the data read from only one of the plurality of second data blocks mismatches the first predetermined checksum and the checksum of the first parity information mismatches the second predetermined checksum, reconstructing the data stored in the first data block with the first parity information, the second parity information, and data read from other second data blocks of the plurality of second data blocks; and
determining the target data corresponding to the first logical block from the reconstructed data.

19. The electronic device of claim 18, wherein determining the recoverability of the target data comprises:
in accordance with a determination that the result of comparison indicates that two or more checksums mismatch, determining that the target data fails to be recovered.

20. The electronic device of claim 16, wherein the stripe further comprises a second parity block, the second parity block storing second parity information, and wherein determining the recoverability of the target data further comprises:
in accordance with a determination that the respective checksums of the data read from the plurality of second data blocks matches the first predetermined checksum and the checksum of the first parity information mismatches the second predetermined checksum, reconstructing the data stored in the first data block with the second parity information and the data read from the plurality of second data blocks; and
determining the target data corresponding to the first logical block from the reconstructed data.

21. The electronic device of claim 16, wherein determining the recoverability of the target data further comprises:
after the target data in the first data block is reconstructed, decompressing the target data;
comparing a checksum of the decompressed target data with an expected checksum for the first logical block;
in accordance with a determination that the checksum of the decompressed target data matches the expected checksum, determining that the target data has been successfully recovered; and
in accordance with a determination that the checksum of the decompressed target data mismatches the expected checksum, determining that the target data fails to be recovered.

22. The electronic device of claim 16, wherein each of the plurality of second data blocks stores compressed data from a plurality of second logical blocks and checksum seed data, the checksum seed data being stored between boundaries of the compressed target data of two of the plurality of logical blocks.

23. The electronic device of claim 16, wherein the first parity information is obtained by performing an XOR operation on data stored in the first data block and the plurality of second data blocks, and
wherein the second predetermined checksum is zero in a case that the number of data blocks of the stripe is an even number, and the second predetermined checksum is the same as the first predetermined checksum in a case that the number of data blocks of the stripe is an odd number.

24. The electronic device of claim 16, wherein the RAID system is a RAID 6 type storage system, and the stripe comprises two parity blocks.

25. An electronic device, comprising:
at least one processor; and
at least one memory having computer program instructions stored therein, the at least one memory and the computer program instructions configured to, with the at least one processor, cause the electronic device to perform acts comprising:
in accordance with a determination that target data in a plurality of logical blocks are to be written into a data block of a stripe of a redundant array of independent disks (RAID) system, compressing the target data in the plurality of logical blocks in unit of logical blocks;
determining checksum seed data based on the compressed target data such that a checksum of the compressed target data and the checksum seed data is equal to a first predetermined checksum; and
writing the compressed target data and the checksum seed data into the data block.

26. The electronic device of claim 25, wherein writing the compressed target data and the checksum seed data into the data block comprises:
storing the checksum seed data between boundaries of the compressed target data of two of the plurality of logical blocks.

27. The electronic device of claim 25, wherein the stripe comprises a plurality of data blocks for storing data, the data block being included in the plurality of data blocks, and a checksum of data stored in the plurality of data blocks is equal to the first predetermined checksum, and
wherein the stripe comprises a plurality of parity blocks, and parity information stored in a first parity block of the plurality of parity blocks is obtained by performing an XOR operation on the data stored in the plurality of data blocks, a checksum of the parity information is a second predetermined checksum which is determined based on the number of the plurality of data blocks.

28. The electronic device of claim 27, wherein the second predetermined checksum is zero in a case that the number of the plurality of data blocks is an even number, and the second predetermined checksum is the same as the first predetermined checksum in a case that the number of the plurality of data blocks is an odd number.

29. The electronic device of claim 25, wherein the RAID system is a RAID 6 type storage system, and the stripe comprises two parity blocks.

30. A computer program product having a non-transitory computer readable medium which stores a set of instructions to perform data recovery; the set of instructions, when carried out by computerized circuitry, causing the computerized circuitry to perform a method of:

reading target data corresponding to a first logical block from a first data block of a stripe of a redundant array of independent disks (RAID) system, the target data being a compressed version of data in the first logical block;

in accordance with a determination that an error occurs in the target data, reading data from a plurality of second data blocks of the stripe and first parity information from a first parity block of the stripe;

comparing respective checksums of the data read from the plurality of second data blocks with a first predetermined checksum and a checksum of the first parity information with a second predetermined checksum; and determining recoverability of the target data based on a result of the comparison.

31. A computer program product having a non-transitory computer readable medium which stores a set of instructions to perform data writing; the set of instructions, when carried out by computerized circuitry, causing the computerized circuitry to perform a method of:

in accordance with a determination that target data in a plurality of logical blocks are to be written into a data block of a stripe of a redundant array of independent disks (RAID) system, compressing the target data in the plurality of logical blocks in unit of logical blocks;

determining checksum seed data based on the compressed target data such that a checksum of the compressed target data and the checksum seed data is equal to a first predetermined checksum; and writing the compressed target data and the checksum seed data into the data block.

* * * * *